(12) United States Patent
Bonefas et al.

(10) Patent No.: US 9,043,129 B2
(45) Date of Patent: May 26, 2015

(54) METHOD FOR GOVERNING A SPEED OF AN AUTONOMOUS VEHICLE

(75) Inventors: Zachary Thomas Bonefas, Urbandale, IA (US); Noel Wayne Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 675 days.

(21) Appl. No.: 12/898,157

(22) Filed: Oct. 5, 2010

(65) Prior Publication Data

US 2012/0083982 A1     Apr. 5, 2012

(51) Int. Cl.
*G08G 1/16* (2006.01)
*G05D 1/02* (2006.01)

(52) U.S. Cl.
CPC .............. *G05D 1/0223* (2013.01); *G05D 1/024* (2013.01); *G05D 1/0242* (2013.01); *G05D 1/0246* (2013.01); *G05D 1/0257* (2013.01); *G05D 1/0274* (2013.01); *G05D 1/0278* (2013.01); *G05D 2201/0201* (2013.01); *G05D 2201/0202* (2013.01)

(58) Field of Classification Search
CPC ... G05D 1/0223; G05D 1/024; G05D 1/0246; G05D 1/0274; G05D 2201/0201; G05D 1/0242; G05D 2201/0202; G05D 1/0278; G05D 1/0257
USPC .......... 340/435, 436; 701/1, 23, 96, 300, 301, 701/302
See application file for complete search history.

(56) References Cited

U.S. PATENT DOCUMENTS

| 4,779,095 | A | * | 10/1988 | Guerreri | 340/904 |
|---|---|---|---|---|---|
| 5,040,116 | A | * | 8/1991 | Evans et al. | 701/28 |
| 5,787,385 | A | | 7/1998 | Tognazzini | |
| 6,151,539 | A | * | 11/2000 | Bergholz et al. | 701/25 |
| 6,563,432 | B1 | | 5/2003 | Millgard | |
| 7,164,118 | B2 | | 1/2007 | Anderson et al. | |
| 2003/0076981 | A1 | * | 4/2003 | Smith et al. | 382/104 |
| 2003/0138133 | A1 | * | 7/2003 | Nagaoka et al. | 382/104 |
| 2006/0114318 | A1 | * | 6/2006 | Saka et al. | 348/61 |
| 2006/0207818 | A1 | * | 9/2006 | Fujioka et al. | 180/167 |
| 2007/0182816 | A1 | * | 8/2007 | Fox | 348/118 |
| 2008/0007429 | A1 | * | 1/2008 | Kawasaki et al. | 340/905 |
| 2008/0162004 | A1 | * | 7/2008 | Price et al. | 701/50 |
| 2010/0063651 | A1 | | 3/2010 | Anderson | |
| 2010/0063664 | A1 | | 3/2010 | Anderson | |
| 2010/0063672 | A1 | | 3/2010 | Anderson | |
| 2010/0094481 | A1 | | 4/2010 | Anderson | |
| 2010/0094499 | A1 | | 4/2010 | Anderson | |

OTHER PUBLICATIONS

Dima et al., "Sensor and Classifier Fusion for Outdoor Obstacle Detection: an Application of Data Fusion to Autonomous Off-Road Navigation", 32nd Applied Imagery Recognition Workshop (AIPR2003) IEEE Computer Society, Oct. 2003, pp. 255-262.

(Continued)

*Primary Examiner* — Stephen Holwerda
(74) *Attorney, Agent, or Firm* — Yee & Associates, P.C.

(57) ABSTRACT

A method of adjusting a speed of a mobile machine is provided. Image data of a location is collected where currently generated sensor data and previously generated sensor data indicate a discontinuity in sensor data. The image data is analyzed to determine if a non-motion blur score for the image data is above a threshold value. Then, a speed of the mobile machine is adjusted based on a determination that the non-motion blur score is above the threshold value.

14 Claims, 11 Drawing Sheets

(56) References Cited

OTHER PUBLICATIONS

Wellington et al., "Learning Predictions of the Load-Bearing Surface for Autonomous Rough-Terrain Navigation in Vegetation", The 4th International Conference on Field and Service Robotics, Jul. 2003, pp. 49-54.

Chen et al., "No-Reference Image Blur Assessment Using Multiscale Gradient", Quality of Multimedia Experience, 2009, pp. 70-74.

Chung et al., "An Edge Analysis Based Blur Measure for Image Processing Applications", Journal of Taiwan Normal University: Mathematics, Science & Technology, vol. 51, No. 1, 2006, 12 pages.

Kedar et al., "Optical Wireless Communication through Fog in the Presence of Pointing Errors", Applied Optics, vol. 42, No. 24, 2003, pp. 4946-4954.

Liu et al., Image Partial Blur Detection and Classification, IEEE Conference on Computer Vision and Pattern Recognition, 2008, pp. 1-8.

* cited by examiner

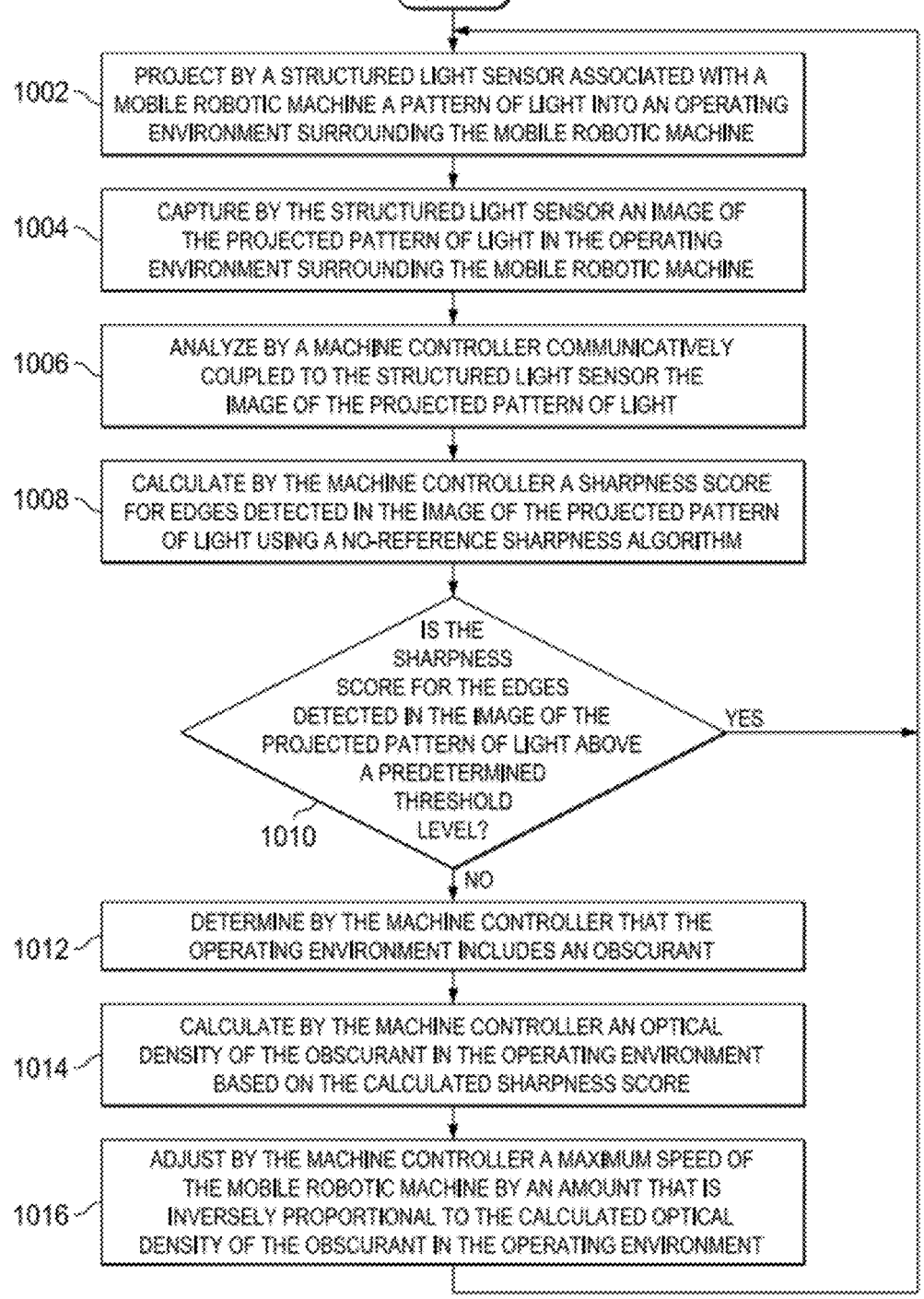

METHOD FOR GOVERNING A SPEED OF AN AUTONOMOUS VEHICLE

FIELD OF THE INVENTION

The present invention relates generally to a mobile machine system and more particularly to a method and system for governing a maximum speed of an autonomous or semi-autonomous vehicle.

BACKGROUND OF THE INVENTION

Perception systems for safeguarding and localization of autonomous and semi-autonomous vehicles may utilize many different sensing modalities, such as, for example, laser devices, color cameras, thermal cameras, ultrasonic devices, and radar devices, to detect obstacles and localize the vehicles in their operating environment. However, many environmental conditions may exist that will retard or reduce the effective range of these perception systems. For instance, cameras and other types of optical sensors may not be able to penetrate obscurants such as dust, smoke, and fog. In addition, topographical features of the terrain within the operating environment may also make it impossible for the perception systems to make observations out to their nominal maximum range.

SUMMARY

An embodiment of the present invention provides a method of adjusting a speed of a mobile machine. Image data of a location is collected where currently generated sensor data and previously generated sensor data indicate a discontinuity in sensor data. The image data is analyzed to determine if a non-motion blur score for the image data is above a threshold value. Then, a speed of the mobile machine is adjusted based on a determination that the non-motion blur score is above the threshold value.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

FIG. 10 is a flowchart illustrating another alternate example process for adjusting a maximum speed of an autonomous or semi-autonomous vehicle in accordance with an illustrative embodiment.

DESCRIPTION OF THE PREFERRED EMBODIMENT

Figure 1:
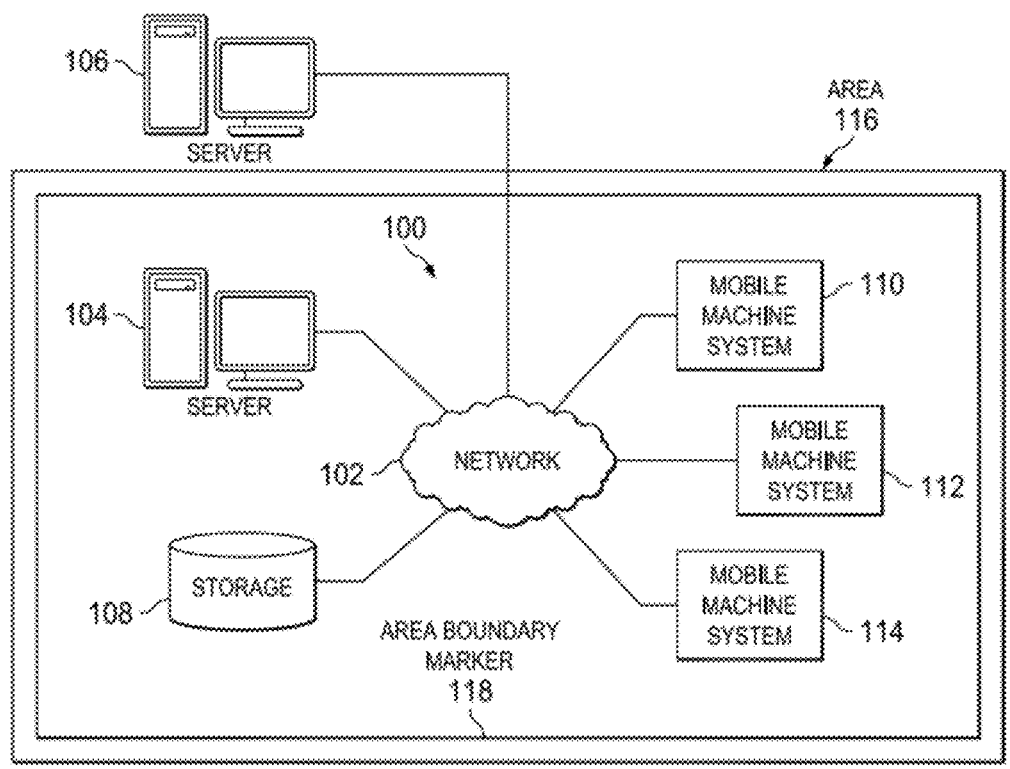
FIG. 1 is a diagram of a network of data processing systems in which an illustrative embodiment may be implemented.

Illustrative embodiments of the present invention provide systems and methods for governing a maximum speed of an autonomous or semi-autonomous vehicle when environmental and/or topographical conditions reduce a maximum effective detection range of the vehicle's sensor system. A machine controller associated with the vehicle determines a location within an operating environment of the vehicle where discontinuity exists between currently generated laser data and previously generated laser data for the operating environment. The machine controller then selects image data that corresponds to the location where the discontinuity exists between the currently generated laser data and the previously generated laser data for the operating environment. In addition, the machine controller determines whether a non-motion blur score for the selected image data is above a predetermined threshold value. In response to determining that the non-motion blur score for the selected image data is above the threshold value, the machine controller determines that the operating environment includes an obscurant. Then, the machine controller adjusts a speed of the vehicle based on an optical density of the obscurant within the operating environment.

Field robots are a superset of mobile teleoperated, supervised, and fully autonomous robotic machines of all sizes. For example, field robots may include all sizes of trucks, tractors, earth movers, helicopters, aircraft, boats, submarines, bulldozers, crop harvesters, service vehicles, supply carriers, and the like. Service robots are smaller field robots, such as robotic lawn mowers, pool cleaners, floor scrubbers, and vacuum cleaners. These field robotic or autonomous systems, sometimes referred to as mobile robotic platforms, generally have a robotic control system that controls the operational systems of the mobile machine.

Sensor inputs to the robotic control system may include data associated with the platform's destination, preprogrammed path information, detected obstacle information, and detected environmental information. Based on data associated with the information above, the mobile robotic platform's movements are controlled. Obstacle detection systems within a platform may, for example, use a camera or multiple cameras to capture images over the broad field of view, or of a particular spectrum within the field of view. For obstacle detection applications of a mobile robotic machine, the response time for collecting image data should be rapid over a wide field of view to facilitate early recognition and avoidance of obstacles.

In addition, these mobile robotic platforms also include a locomotion system, a power system, a task payload system, such as a cutting unit for crop harvesting, and a path planning system. Path planning may include point-to-point planning or area coverage planning. Area coverage may be random coverage of an area by the mobile robotic machine over a predetermined period of time or may be precise area coverage with localization. Localization perception or location sensing devices for service robots may, for example, include laser scanners, compasses, odometers, global positioning system receivers, and vision-based triangulation systems. Further, these mobile robotic platforms also include perception for safeguarding to prevent damage to the machine, itself, or other objects that may be present in the machine's operating environment.

Currently, many mobile robotic machines utilize radar sensors in applications where highly accurate perception sensors, such as laser scanners, are not required. Radar uses electromagnetic waves and depending on the frequency may easily penetrate almost any obscurant with very little attenuation of energy. An obscurant is anything that makes an object within an operating environment of an autonomous mobile machine indistinct or hidden from detection by one or more sensors of the machine. In other words, an obscurant reduces a sensor's ability to perceive or reach its maximum effective detection range. A maximum effective detection range is the greatest distance a sensor is supposed to be able to perceive and collect data accurately.

However, radar sensors are typically very low angular resolution sensors that provide minimal data, which makes interpreting the radar readings less precise for the controller systems. Thus, radar sensors are not suitable for standalone use in a perception system of a mobile robotic machine, especially in an agricultural, construction, turf care, or forestry operating environment. If properly utilized, laser-based perception systems may provide easy to interpret data and may detect much more subtle obstacles with very precise localization.

When a laser-based perception system emits a laser pulse into an operating environment of a mobile robotic machine, typically the energy of the laser pulse reflects off multiple surfaces and returns to a detector. Most laser scanners only measure the first pulse that returns to the detector. In an effort to achieve greater penetrability through obscurants, illustrative embodiments may utilize laser scanners that leave the detector open after the first return pulse is detected to measure multiple return pulses. However, it should be noted that all of the energy of an emitted laser pulse may be dissipated by moderate dust such that no measurable return energy is detected.

Illustrative embodiments to overcome these sensor perception shortcomings of current mobile robotic machines determine the maximum effective detection range of the perception system for safeguarding and localization and then govern the maximum speed of the mobile robotic machines accordingly. Basically, a mobile robotic machine should adhere to the principle "don't out drive your headlights". In other words, a mobile robotic machine should not operate at a speed beyond which the machine's sensor system is capable of perceiving and reacting to environmental and topographical conditions within the operating environment for safe operation. Reacting includes without limitation stopping before contacting an object in the environment, maneuvering around the object, or otherwise altering the behavior of the machine compared to the behavior of the machine if the object were not detected.

Illustrative embodiments use sensors, such as radar or light detection and ranging, to "see through" obscurants and to maintain a relatively constant maximum effective sensor detection range. Illustrative embodiments do not improve upon the sensors themselves, but rather use the data obtained by the sensors to identify environmental and topographical conditions that may diminish the sensors' maximum effective detection range.

Illustrative embodiments use a combination of laser scanner data and visual imaging data to detect obscurants, such as dust. Sporadic laser data is often an indication of an obscurant. Illustrative embodiments analyze the laser data for patterns that are indicative of an obscurant, dynamically determine the limited effective detection range of the sensor system, and then set a new maximum speed limit for the mobile robotic vehicle based on the sensor system's decreased effective detection range and the dynamics of the vehicle.

The dynamics of the vehicle may, for example, include braking distance of the vehicle, reaction time of the vehicle, turning radius of the vehicle, and whether an avoidance maneuver or a stopping maneuver is initiated by the vehicle. In addition, the topography of the operating environment may influence the dynamics of the vehicle. For example, if the vehicle is going uphill or downhill, then the vehicle's braking distance and turning radius may be affected.

Further, illustrative embodiments analyze image data from one or more cameras to detect obscurants. For example, a dusty scene generally yields very weak edge data for objects within the image data. Weak edge data is a lack of clear outlines or definitions for objects within the image data or is a lack of texture between objects within the image data. Illustrative embodiments may utilize an edge detection algorithm, such as a Sobel edge detection algorithm, to determine these weak object edges in the image data. In other words, illustrative embodiments may utilize this edge detection technology to determine whether an obscurant is present within the operating environment of the autonomous or semi-autonomous mobile robotic machines by detecting weak object edges in an image of the operating environment.

In order to combine the laser data and the camera image data, illustrative embodiments calibrate the sensors such that it is possible to associate the data from the lasers and cameras by mapping laser points to points in the image data in three-dimensional space. Alternatively, points in the image data may be mapped to the laser points. As a result, illustrative embodiments may use a plurality of logic combinations that lead to a successful fusion approach of the different data types.

As one example, illustrative embodiments may use a temporal approach. For the purpose of vehicle safeguarding, illustrative embodiments visualize the operating environment as a collection of three dimensional cubes called voxels. When a light detection and ranging sensor emits a laser pulse into an operating environment of the mobile robotic machine, the laser pulse usually passes through several voxels until the laser pulse hits an object and returns to the detector.

Illustrative embodiments count the number of hits and pass-throughs for voxels by tracing the path of each laser pulse. A voxel or a set of voxels, which scores relatively few hits to the number of times that laser pulses pass through it, is considered to be empty. However, if these voxels, which were previously classified as empty, suddenly start to exhibit a much higher ratio of hits, it could be an indication that an obscurant, such as dust, or a dynamic obstacle, such as a person, has entered the operating environment.

Relying on the laser data alone may make it very difficult to determine whether the sudden appearance of laser hits in a volume of space is due to an obscurant or to a legitimate dynamic obstacle. Thus, examining image data associated with that particular volume of space for the presence of object edges may provide illustrative embodiments with valuable information. A lack of strong object edges in that particular volume of space almost certainly indicates that an obscurant is present because it is very rare for a legitimate obstacle not to produce strong edges in an image.

Illustrative embodiments also use sensors to detect terrain uncertainty due to topography. In the case where the maximum effective detection range or distance of the sensor system of the mobile robotic machine is reduced by the topography of the land, the problem is much simpler for illustrative embodiments. For example, the laser sensors will not be able to intersect the ground beyond a certain distance due to the topographical feature, such as a hill. As a result, no laser data about the terrain beyond that topographical feature will exist.

However, illustrative embodiments may utilize topographical maps to anticipate blind spots caused by the terrain. A mobile robotic machine controller system that has knowledge of the topography of the land, the mounting locations and characteristics of the safeguarding sensors, and the planned path of the machine may accurately predict the maximum effective detection distance of the safeguarding sensor system anywhere along the planned path. Using this level of understanding, illustrative embodiments may enable the creation of more effective multi-vehicle path plans, which may outperform two-dimensional path planners.

With reference now to the figures and in particular with reference to FIGS. 1-4, exemplary diagrams of data processing environments are provided in which illustrative embodiments may be implemented. It should be appreciated that FIGS. 1-4 are only exemplary and are not intended to assert or imply any limitation with regard to the environments in which different embodiments may be implemented. Many modifications to the depicted environments may be made.

FIG. 1 depicts a diagram of a network of data processing systems in which an illustrative embodiment may be implemented. Network data processing system 100 is a network of data processing systems and other devices in which the illustrative embodiments may be implemented. Network data processing system 100 contains network 102, which is the medium used to provide communications links between various data processing systems and other devices connected together within network data processing system 100. Network 102 may include connections, such as wire, wireless communication links, or fiber optic cables.

In the depicted example, server 104 and server 106 connect to network 102 along with storage unit 108. In addition, mobile machine system 110, mobile machine system 112, and mobile machine system 114 also connect to network 102. Mobile machine system 110, mobile machine system 112, and mobile machine system 114 are clients to server 104 and/or server 106 in this example.

In the depicted example, server 104 provides information, such as boot files, operating system images, and applications to mobile machine system 110, mobile machine system 112, and mobile machine system 114. Server 104 may represent a local server that is located, for example, in an agricultural complex in area 116. Server 106 may represent a remote server that is located, for example, at a Web service for controlling autonomous and semi-autonomous mobile robotic machines. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to mobile machine system 110 over network 102 for use on mobile machine system 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN).

Mobile machine systems 110, 112, and 114 are data processing systems that include autonomous or semi-autonomous mobile robotic machines that perform tasks, such as crop harvesting, crop irrigation, or crop fertilization, in area 116. In addition, even though this example illustrates three mobile machine systems, illustrative embodiments are not restricted to such. In other words, illustrative embodiments may include more or fewer mobile machine systems to provide autonomous or semi-autonomous robotic tasks and services within area 116.

Area 116 is the operating environment for mobile machine systems 110, 112, and 114. Area 116 for may, for example, be an agricultural zone for growing and harvesting crops, such as corn, wheat, barley, potatoes, cotton, peanuts, and the like. However, the vegetation in area 116 may include any species of plant. Furthermore, area 116 is only one example of a mobile robotic machine operating environment or worksite. Other types of mobile machine worksites and tasks may include, but are not limited to, highways and snow removal, golf courses and grass mowing, forests and tree felling, and construction sites and earth moving. Area 116 may also include structures, such as commercial buildings, residential houses, storage barns, equipment sheds, and parking lots. Further, area 116 may be contiguous or non-contiguous.

Further, area 116 also includes area boundary marker 118. Area boundary marker 118 marks the boundaries of area 116 for mobile machine systems 110, 112, and 114. Mobile machine systems 110, 112, and 114 use area boundary marker 118 to identify which portion(s) of area 116 are to have robotic tasks performed. Area boundary marker 118 may, for example, be an electrical wire or an optical demarcation of the boundary.

Also, even though area boundary marker 118 is shown as a single marker in this example, area boundary marker 118 may include a plurality of markers. In addition, even though area boundary marker 118 is shown as having a square configuration, area boundary marker 118 may be configured in any shape or configuration necessary. However, it should be noted that area boundary marker 118 is an optional feature. In other words, area 116 does not have to include a boundary marker for the autonomous or semi-autonomous mobile robotic machines. Moreover, FIG. 1 is only intended as an example, and not as an architectural limitation for the different illustrative embodiments.

Figure 2:
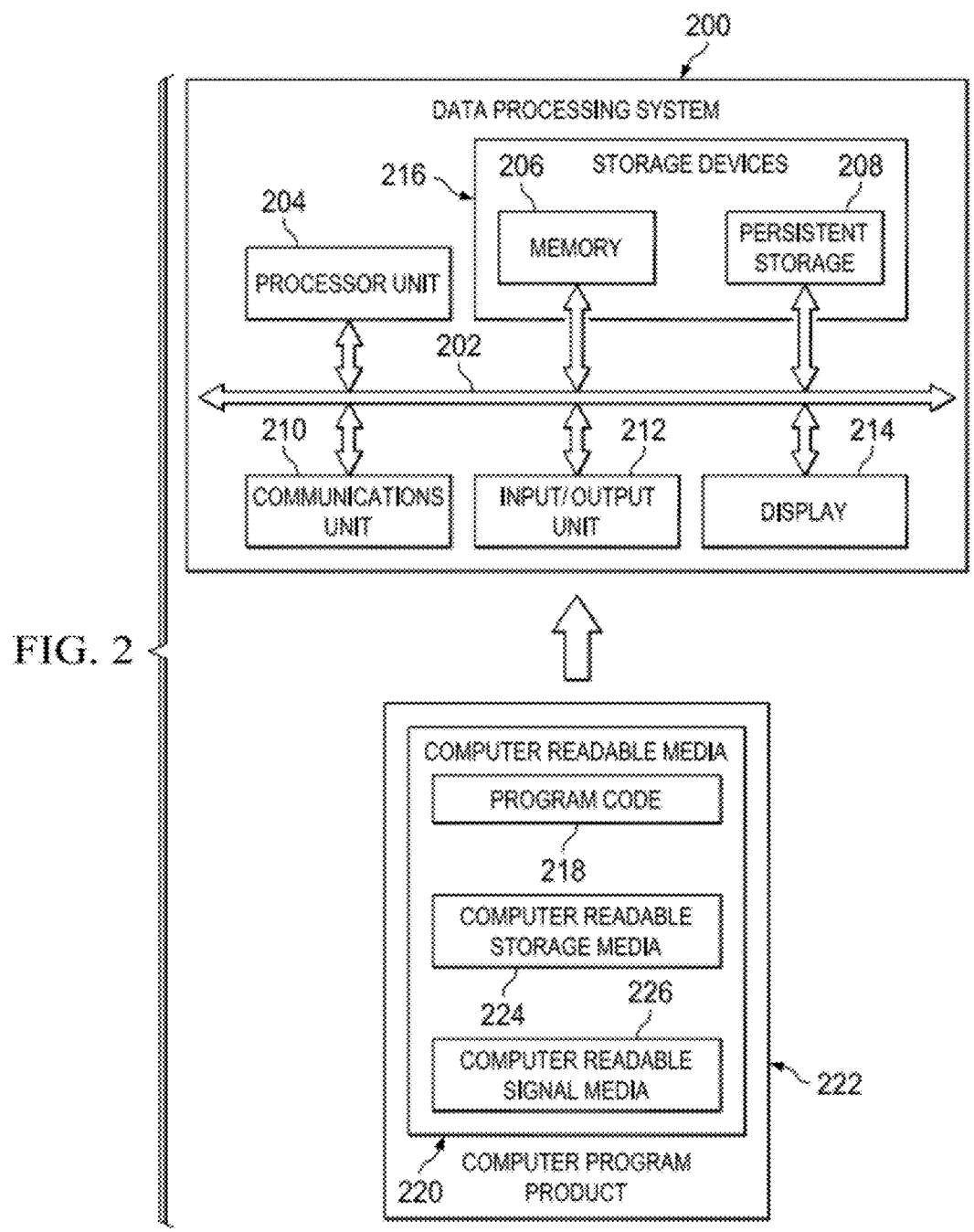
FIG. 2 is a block diagram of a data processing system in which an illustrative embodiment may be implemented.

With reference now to FIG. 2, a block diagram of a data processing system is depicted in which an illustrative embodiment may be implemented. Data processing system 200 is an example of a data processing system in which computer usable program code or instructions implementing the processes of an illustrative embodiment may be located. Data processing system 200 may be implemented in a server and/or an autonomous or semi-autonomous mobile robotic machine system, such as server 104 or mobile machine system 110 in FIG. 1. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may, for example, be a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or other mobile machine systems. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
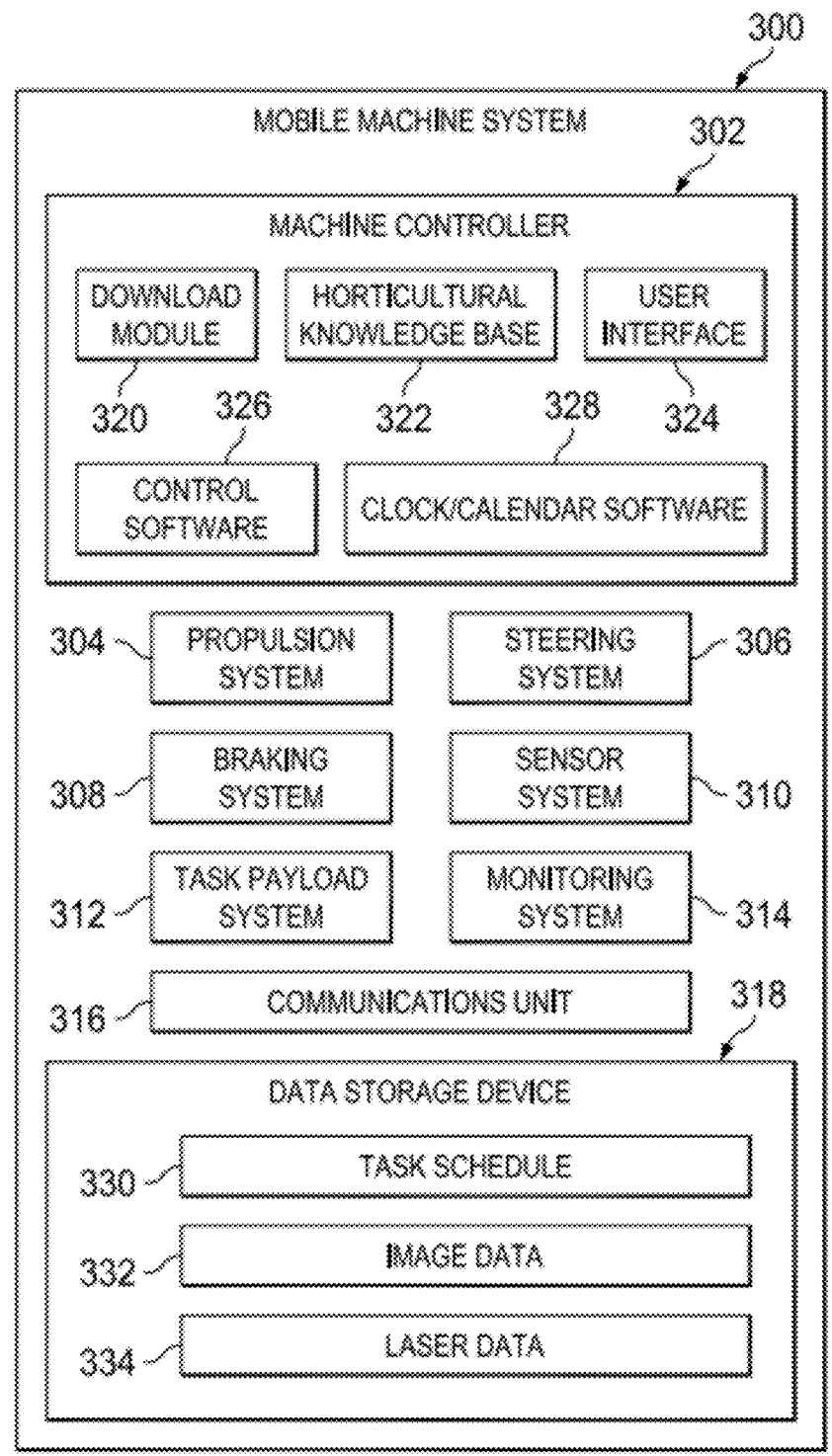
FIG. 3 is a block diagram of a mobile machine system in accordance with an illustrative embodiment.

With reference now to FIG. 3, a block diagram of a mobile machine system is depicted in accordance with an illustrative embodiment. Mobile machine system 300 may, for example, be mobile machine system 110 in FIG. 1. However, it should be noted that mobile machine system 300 is only intended as an example of one possible implementation of a mobile machine system.

Mobile machine system 300 may be an autonomous or semi-autonomous mobile robotic machine that is configured to perform one or more tasks and/or services in one or more designated operating environments, such as area 116 in FIG. 1. Also, the one or more designated areas may be marked or defined by one or more markers, such as area boundary marker 118 in FIG. 1, which identify the desired areas for task performance, such as the plowing of fields, by mobile machine system 300.

Mobile machine system 300 includes machine controller 302, propulsion system 304, steering system 306, braking system 308, sensor system 310, task payload system 312, monitoring system 314, communications unit 316, and data storage device 318. Machine controller 302 includes download module 320, horticultural knowledge base 322, user interface 324, control software 326, and clock/calendar software 328. Machine controller 302 may, for example, be a data processing system, such as data processing system 200 in FIG. 2, or some other device that executes instructions or processes to control functions of mobile machine system 300. Thus, machine controller 302 may be a computer, an application integrated specific circuit, and/or some other suitable device. In addition, different types of devices and systems may be used to provide redundancy and fault tolerance.

Machine controller 302 executes processes using control software 326 to control propulsion system 304, steering system 306, braking system 308, and sensor system 310, which direct and control movement of mobile machine system 300 within the operating environment. Also, machine controller 302 may execute processes using control software 326 to control task payload system 312, which performs robotic tasks, such as, for example, cutting down trees within the operating environment of mobile machine system 300.

Furthermore, machine controller 302 may execute processes using control software 326 to control monitoring system 314, which monitors the power usage of task payload system 312 during each task performance over time. Machine controller 302 may use this power usage data to adaptively adjust scheduling of tasks, such as cutting vegetation based on the vegetation density. The vegetation density may be indirectly determined by the amount of power drawn by task payload system 312 during each cutting task and a known vegetation growth model.

Machine controller 302 may send various commands to these components to operate mobile machine system 300 in different modes of operation. These commands may take various forms depending on the implementation. For example, the commands may be analog electrical signals in which a voltage and/or current change is used to control these systems. In other implementations, the commands may take the form of data sent to the systems to initiate the desired functions or actions.

Download module 320 provides for online updates of horticultural knowledge base 322 by a network server, such as server 104 or server 106 in FIG. 1. In addition, download module 320 may also provide for online updates of current and future environmental data or factors from one or more local, regional, and national weather services.

Horticultural knowledge base 322 contains information about the operating environment, such as, for example, a geo-referenced map showing the topography, structures, tree locations, vegetation locations, roadway locations, and other object types and locations, such as ponds, streams, and irrigation equipment. In addition, horticultural knowledge base 322 may also contain information, such as, without limitation, vegetation species located in the operating environment; growth stages and life cycles of the vegetation species located in the operating environment; current weather for the operating environment; weather history for the operating environment; specific environmental features of the operating environment that may affect mobile machine system 300; and the like. It should be noted that horticultural knowledge base 322 may be located entirely in mobile machine system 300 or a portion or all of horticultural knowledge base 322 may be located in a remote location, such as storage 108 in FIG. 1, which mobile machine system 300 may access via communications unit 316. Communications unit 316 may, for example, be communications unit 210 in FIG. 2.

User interface 324 may, in one illustrative embodiment, be implemented in a display device, such as display 214 in FIG. 2. User interface 324 may be mounted on mobile machine system 300 and viewable by a user. User interface 324 may, for example, display sensor data obtained from sensor system 310 regarding the operating environment surrounding mobile machine system 300, as well as messages, alerts, and queries for the user. In other illustrative embodiments, user interface 324 may be implemented in a remote display device held by the user or may be implemented in a remote data processing system, such as server 104 in FIG. 1.

Clock/calendar software 328 is a software application that provides time and date information. In addition, clock/calendar software 328 is capable of receiving user inputs regarding scheduled tasks and activities within the operating environment. Thus, machine controller 302 may use clock/calendar software 328 to determine when to send power up commands to mobile machine system 300 based on task schedule 330, to determine seasons of the year for known vegetation growing models, and to determine when to adjust task schedule 330.

In this example, propulsion system 304 propels or moves mobile machine system 300 in response to commands from machine controller 302. Propulsion system 304 may maintain, decrease, or increase the speed at which mobile machine system 300 moves in response to instructions received from machine controller 302. Propulsion system 304 may be an electrically controlled propulsion system. In addition, propulsion system 304 may, for example, be a diesel engine, an internal combustion engine, an internal combustion engine/electric hybrid system, an electric engine, or some other suitable propulsion system.

Steering system 306 controls the direction or steering of mobile machine system 300 in response to commands received from machine controller 302. Steering system 306 may, for example, be an electrically controlled hydraulic steering system, an electrically driven rack and pinion steering system, an Ackerman steering system, a skid-steer steering system, a differential steering system, or some other suitable steering system.

Braking system 308 slows down and/or stops mobile machine system 300 in response to commands from machine controller 302. Braking system 308 may be an electrically controlled braking system. In addition, braking system 308 may, for example, be a hydraulic braking system, a friction braking system, or some other suitable braking system that may be electrically controlled.

Sensor system 310 is a high integrity perception system and may be a set of sensors used to collect information about the operating environment around mobile machine system 300. In this example, sensor system 310 sends the collected information to machine controller 302 to provide data for identifying how mobile machine system 300 should operate within the environment. For example, sensor system 310 may send data to machine controller 302 regarding the presence of an obscurant or obstacle within the operating environment. Sensor system 310 may detect the presence of an obscurant or obstacle within the operating environment by using, for example, a light detection and ranging sensor and a camera. In this example, a set refers to two or more sensors.

Communications unit 316 is a high integrity communications system and may provide multiple redundant communications links and channels to machine controller 302 in order for machine controller 302 to receive information. The communication links and channels may be heterogeneous and/or homogeneous redundant components that provide fail-safe communication. This received information may, for example, include data, commands, and/or instructions.

Communications unit 316 may take various forms. For example, communications unit 316 may include a wireless communications system, such as a cellular phone system, a wireless fidelity (Wi-Fi) technology system, a Bluetooth wireless technology system, and/or some other suitable wireless communications system. Further, communications unit 316 also may include a communications port, such as, for example, a universal serial bus port, a serial interface, a parallel port interface, a network interface, and/or some other suitable port to provide a physical communications link. Communications unit 316 may be used to communicate with a user, another mobile machine system, or a remote data processing system, such as a server.

Data storage device 318 is one example of persistent storage 208 in FIG. 2. Data storage device 318 stores task schedule 330, image data 332, and laser data 334. Machine controller 302 uses task schedule 330 to determine when to send a command to mobile machine system 300 to perform a task. Task schedule 330 may be a default task schedule, a task schedule entered by the user via user interface 324, or a modified task schedule generated by machine controller 302.

Image data 332 is a file that stores information regarding images captured around mobile machine system 300 within the operating environment. Image data 332 is captured by an imaging device, such as a camera, within sensor system 310. Image data 332 may include data, such as, for example, still images captured by a camera, video images captured by a video camera, stereographic images captured by a stereographic camera system, and/or thermal images captured by an infrared camera. In addition, machine controller 302 may map points found in image data 332 to a virtual three-dimensional map of the operating environment surrounding mobile machine system 300.

Further, machine controller 302 may associate these mapped image data points to corresponding laser points found in laser data 334. Laser data 334 is a file that stores information regarding returned laser pulses received from around mobile machine system 300 within the operating environment. The laser pulses are emitted by a laser scanner, such as a light detection and ranging device, within sensor system 310. Moreover, machine controller 302 may map points found in laser data 334 to the virtual three-dimensional map of the operating environment surrounding mobile machine system 300 and associate these mapped laser data points to corresponding image points found in image data 332.

The illustration of mobile machine system 300 in FIG. 3 is not meant to imply physical or architectural limitations on the manner in which different advantageous embodiments may be implemented. Other components in addition to or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments horticultural knowledge base 322 may be separate and distinct from mobile machine system 300, but capable of being used by mobile machine system 300.

Figure 4:
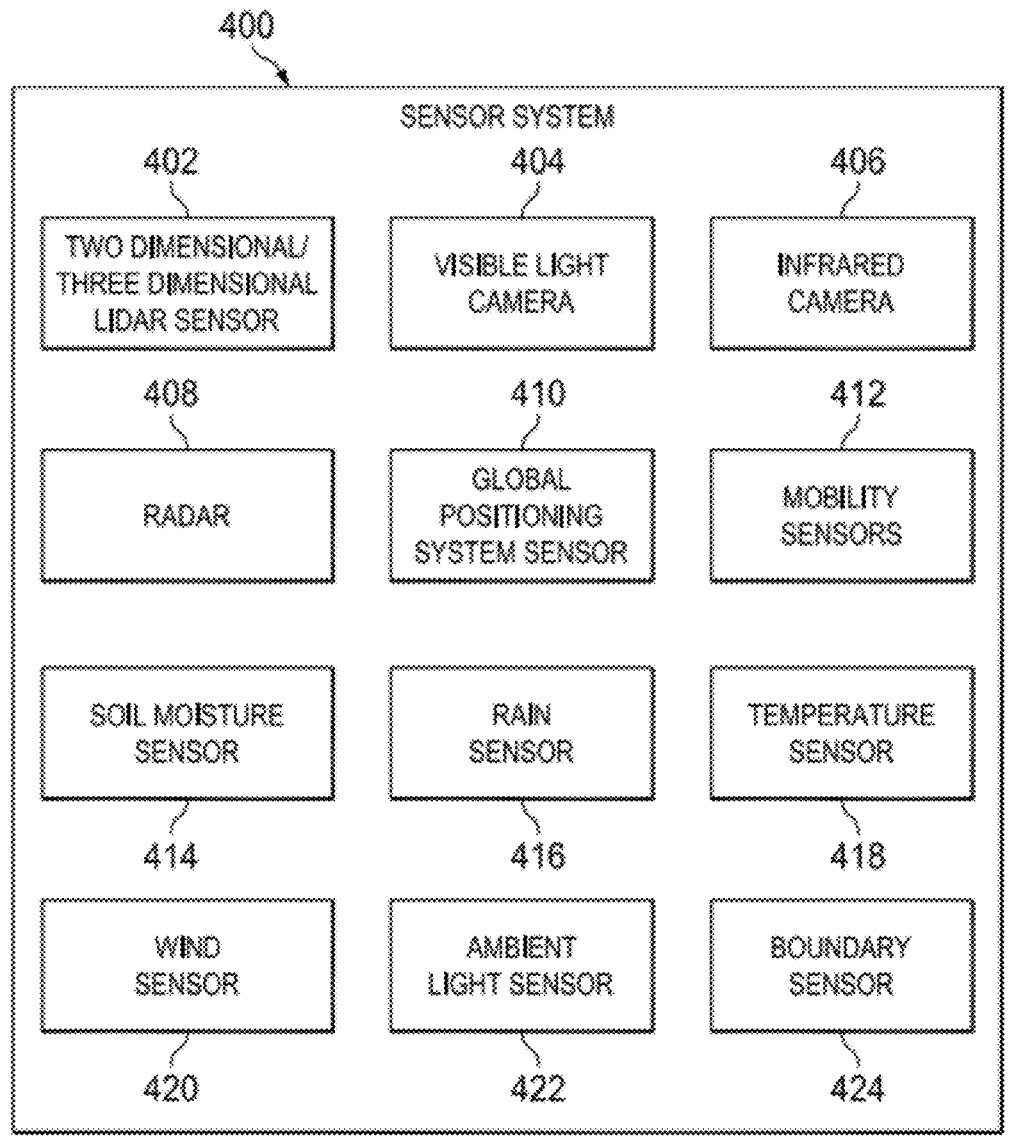
FIG. 4 is a block diagram of a sensor system in accordance with an illustrative embodiment.

With reference now to FIG. 4, a block diagram of a sensor system is depicted in accordance with an illustrative embodiment. Sensor system 400 is an example of one implementation of sensor system 310 in FIG. 3.

As illustrated, sensor system 400 includes two dimensional/three dimensional light detection and ranging (LIDAR) sensor 402, visible light camera 404, infrared camera 406, radio detection and ranging (RADAR) 408, global positioning system (GPS) sensor 410, mobility sensors 412, soil moisture sensor 414, rain sensor 416, temperature sensor 418, wind sensor 420, ambient light sensor 422, and boundary sensor 424. A machine controller, such as machine controller 302 in FIG. 3, may use these different sensors to identify conditions within an operating environment of an autonomous or semi-autonomous mobile robotic machine, such as mobile machine system 300 in FIG. 3. The machine controller may select from these different sensors in sensor system 400 such that at least one of these sensors is always capable of sensing information needed to operate the mobile robotic machine safely and effectively within different operating environments.

Two dimensional/three dimensional light detection and ranging sensor 402 emits laser pulses into the operating environment of the mobile robotic machine. Then, two dimensional/three dimensional light detection and ranging sensor 402 captures reflected laser pulses to generate laser data, such as laser data 334 in FIG. 3. The laser data may, for example, be laser points corresponding to two dimensional or three dimensional range matrices for objects within the operating environment. The machine controller uses the laser data to determine distance to an object or surface by measuring the time delay between transmission of a laser pulse and detection of the reflected signal.

In addition, the machine controller may use the laser data to determine whether a dynamic object has entered the operating environment by comparing the reflected signals to previously generated laser data for the operating environment. For example, if continuity exists between the reflected laser signals and the previously generated laser data, then no new objects have entered the operating environment. In other words, no new laser pulse reflections are detected in the operating environment compared to the previously generated laser data. Thus, continuity exists between the currently reflected laser signals and the previously recorded laser signal reflections because the current laser data and the previously generated laser data is essentially the same.

Conversely, if continuity does not exist between the reflected laser signals and the previously generated laser data, then one or more new objects have entered the operating environment. In other words, new laser pulse reflections are detected in the operating environment compared to the previously generated laser data. As a result, no continuity exists between the currently reflected laser signals and the previously recorded laser signal reflections because the current laser data and the previously generated laser data are different.

A discontinuity includes without limitation a difference in time-of-flight or range values, a difference in return signal strength values, a difference in return signal frequency values, or a difference in position of a return signal within a field of view. Typically, small variations in the difference between a first signal value and a second signal value will occur in the course of normal sensor operation. These small variations or noise in the signal difference value may be caused, for example without limitation, by analog to digital conversion error in the original signals. Thus, a threshold difference value may be used to define when the difference is a discontinuity and not noise. The threshold may be precisely defined or defined without limitation in terms of a probability, a fuzzy membership function, or other suitable classification means. A discontinuity may be calculated as a simple numeric difference between two values. A discontinuity may also be calculated using any suitable mathematical function, logical function, or algorithm using any number of values.

Also, two dimensional/three dimensional light detection and ranging sensor 402 may include a structured light sensor. The structured light sensor emits light in a pattern, such as one or more lines, reads back the reflections of the light pattern through a camera, and interprets the reflections to detect and measure objects in the operating environment. For example, the machine controller may also use the structured light sensor to detect obscurants and obstacles within the operating environment.

Visible light camera 404 may be a standard still-image camera, which may be used alone for color information or with a second camera to generate stereoscopic, or three-dimensional, images. When visible light camera 404 is used along with a second camera to generate stereoscopic images, the two or more cameras may be set with different exposure settings to provide improved performance over a range of lighting conditions.

Visible light camera 404 may also be a video camera that captures and records images. As a result, visible light camera 404 may be a component in a video-based object recognition system. The video-based object recognition system uses shape recognition to trigger alerts when a target is matched.

One capability provided by video system monitoring of the operating environment is obscurant and obstacle detection. The machine controller may use the information regarding the detection of an obscurant, such as dust, or an obstacle in the operating environment to adjust or decrease a maximum speed of the mobile robotic machine for safe operation. In addition, the machine controller may use this information to initiate an action, such as an avoidance maneuver, for the mobile robotic machine. Furthermore, the machine controller may communicate this information to other mobile robotic machines operating in the area. Further, the video-based object recognition system may be used to verify that the mobile robotic machine is operating in the correct section of the operating environment.

While illustrative embodiments may use light detection and ranging and vision to identify the obscurant when an obstacle is present, illustrative embodiments may also use structured light, especially for detecting an obscurant when no obstacle is present. In basic form, a light pattern of laser or another light source is projected into the operating environment and a camera is used to obtain an image of the light pattern as it strikes objects in the operating environment. Lack of, or blurring of, edges of the structured light lines, points, and/or regions in the camera image may be indicative of an obscurant.

Infrared camera 406 may form an image using infrared radiation. Thus, infrared camera 406 may detect heat indicative of a living thing versus an inanimate object in the operating environment of the mobile robotic machine. Radio detection and ranging 408 is an object detection system that uses electromagnetic waves to identify the range, altitude, direction, or speed of both moving and fixed objects within the operating environment. Radio detection and ranging 408 may be used in a time of flight mode to calculate distance to an object, as well as Doppler mode to calculate the speed of an object.

The machine controller may use global positioning system (GPS) sensor 410 to identify the location of the mobile robotic machine with respect to other objects in the operating environment. Global positioning system sensor 410 may be any type of radio frequency triangulation scheme based on signal strength and/or time of flight. Examples include, without limitation, the Global Positioning System, Glonass, Galileo, and cellular telephone tower relative signal strength. Position is typically reported as latitude and longitude with an error that depends on factors, such as condition of the ionosphere, satellite constellation, and signal attenuation from vegetation.

The machine controller may use mobility sensors 412 to safely and efficiently guide the mobile robotic machine through the designated operating environment. Mobility sensors 412 may, for example, include an odometer, a compass for dead reckoning, vision and ultrasonic sensors for obstacle/object detection, and/or any other suitable sensor.

Soil moisture sensor 414 detects the current in situ soil moisture from specific portions of the operating environment. Sensor system 400 may transmit this in situ soil moisture data back to a server, such as server 104 in FIG. 1, to assist the server in determining when an irrigation system is to water the vegetation in the operating environment. Rain sensor 416 detects precipitation on an exterior surface of the mobile robotic machine. Temperature sensor 418 detects the ambient temperature of the operating environment. Wind sensor 420 detects the wind speed in the operating environment. Ambient light sensor 422 measures the amount of ambient light in the operating environment.

In one illustrative embodiment, one or more of sensors 416-422 may be located on a charging station instead of on the mobile robotic machine. In addition, one or more of these sensors, such as temperature sensor 418 and wind sensor 420, may be optional features of sensor system 400. Also, a communications unit, such as communications unit 316 in FIG. 3, may transmit data obtained by one or more of these sensors to an online database, such as storage 108 in FIG. 1.

Boundary sensor 424 detects a boundary marker, such as area boundary marker 118 in FIG. 1. The boundary marker may, for example, be a wire that identifies the boundary of the operating environment for the mobile robotic machine. The machine controller uses boundary sensor 424 to determine that the mobile robotic machine is exiting or is about to exit the designed operating environment. Further, in response to detecting the boundary marker, the machine controller may direct the mobile robotic machine to initiate a specific function, such as change the direction of movement.

Moreover, the machine controller may retrieve and coordinate data from two or more sensors in sensor system 400 to obtain different perspectives of the operating environment. For example, the machine controller may obtain laser data from two dimensional/three dimensional light detection and ranging sensor 402, image data from visible light camera 404, and location data from global positioning system sensor 410 or from stored topographical maps in a horticultural knowledge base, such as horticultural knowledge base 322 in FIG. 3, to determine the presence and location of obscurants or obstacles in the operating environment.

Figure 5:
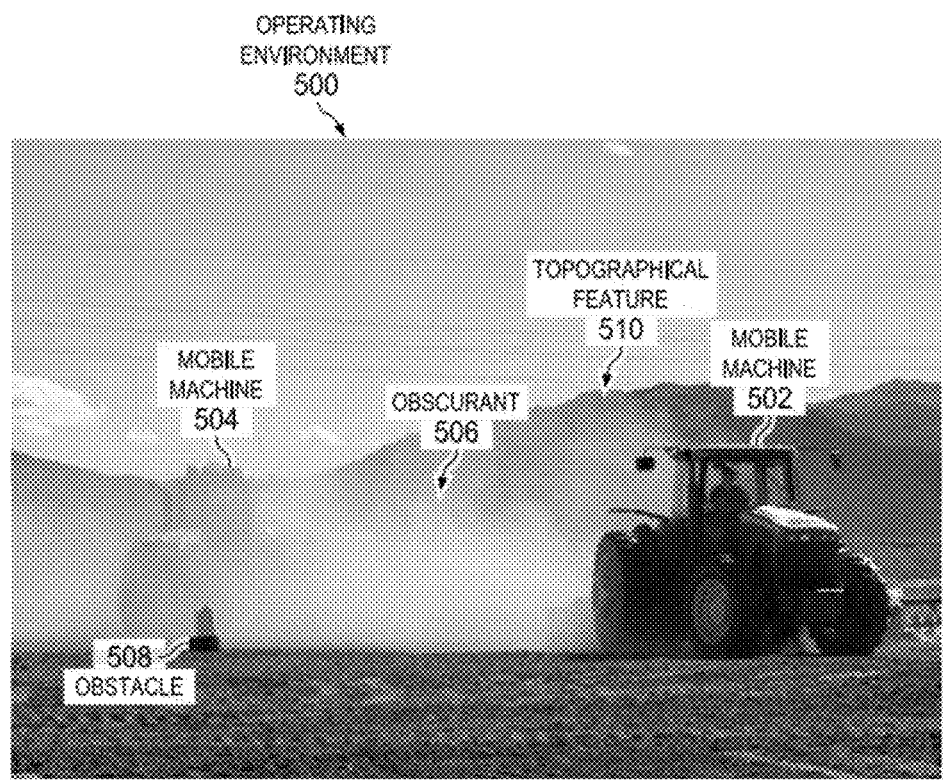
FIG. 5 is a pictorial representation of an operating environment of a mobile machine system in accordance with an illustrative embodiment.

With reference now to FIG. 5, a pictorial representation of an operating environment of a mobile machine system is depicted in accordance with an illustrative embodiment. Operating environment 500 may, for example, be area 116 in FIG. 1. In this example, operating environment 500 is an agricultural environment where mobile machine 502 and mobile machine 504 are performing tasks. However, it should be noted that illustrative embodiments are not limited to agricultural operating environments, but may be implemented in any type of operating environment for autonomous and semi-autonomous mobile robotic machines.

Also in this example, mobile machine 502 and mobile machine 504 are depicted as tractors, but may represent any type of mobile robotic machine. Mobile machine 502 and mobile machine 504 may, for example, be mobile machine system 110 and mobile machine system 112 in FIG. 1. Further, mobile machine 502 and mobile machine 504 may be in communication with one another via a network, such as network 102 in FIG. 1, using a communications unit, such as communications unit 316 in FIG. 3.

Operating environment 500 includes obscurant 506 and obstacle 508. In this example, obscurant 506 is heavy dust, which is produced by mobile machines 502 and 504 during task performance within operating environment 500. However, it should be noted that besides being dust, obscurant 506 may also be fog, smoke, snow, rain, ash, or steam within the operating environment 500. Obscurant 506 obscures obstacle 508 from an imaging sensor, such as visible light camera 404 in FIG. 4, which is included in a sensor system located on mobile machine 504. In other words, obscurant 506 prevents the imaging sensor from detecting sharp edges for obstacle 508 in the captured image data.

Thus, mobile machine 504 may use data obtained from a plurality of sensors within the sensor system, such as two or more sensors in sensor system 400 in FIG. 4, to detect and localize obscurant 506 and obstacle 508 within operating environment 500. Specifically, mobile machine 504 uses a machine controller, such as machine controller 302 in FIG. 3, to correlate the data obtained by the plurality of sensors. For example, the machine controller may correlate image data captured by the imaging sensor and laser data generated by a laser sensor to detect and localize obscurant 506 and obstacle 508. The laser sensor may, for example, be two dimensional/three dimensional light detection and ranging sensor 402 in FIG. 4.

Based on the correlation of data obtained from the plurality of sensors, the machine controller may adjust or decrease a maximum speed of mobile machine 504 for safe operation due to obscurant 506 being present in operating environment 500, which causes a decrease in the maximum effective range of one or more of the sensors in the sensor system. Further, the machine controller may transmit the maximum speed adjustment from mobile machine 504 to mobile machine 502 for a corresponding maximum speed adjustment to mobile machine 502, especially if mobile machines 502 and 504 are performing coordinated tasks using a multi-vehicle path plan. Also, communicating the maximum speed adjustment from mobile machine 504 to mobile machine 502 may prevent loss of communications between the two machines due to increased separation. Moreover, the machine controller may initiate an action, such as an avoidance maneuver or a stopping maneuver, for mobile machine 504 based on the distance to obstacle 508.

Operating environment 500 also includes topographical feature 510. In this example, topographical feature 510 is a hill or an upgrade in the terrain of operating environment 500. However, topographical feature 510 may be any feature that reduces or limits the maximum effective range of the sensor system. In other words, topographical feature 510 prevents sensors within the sensor system from perceiving anything beyond topographical feature 510, even though the actual maximum effective range of the sensor system may reach beyond topographical feature 510.

Figure 6:
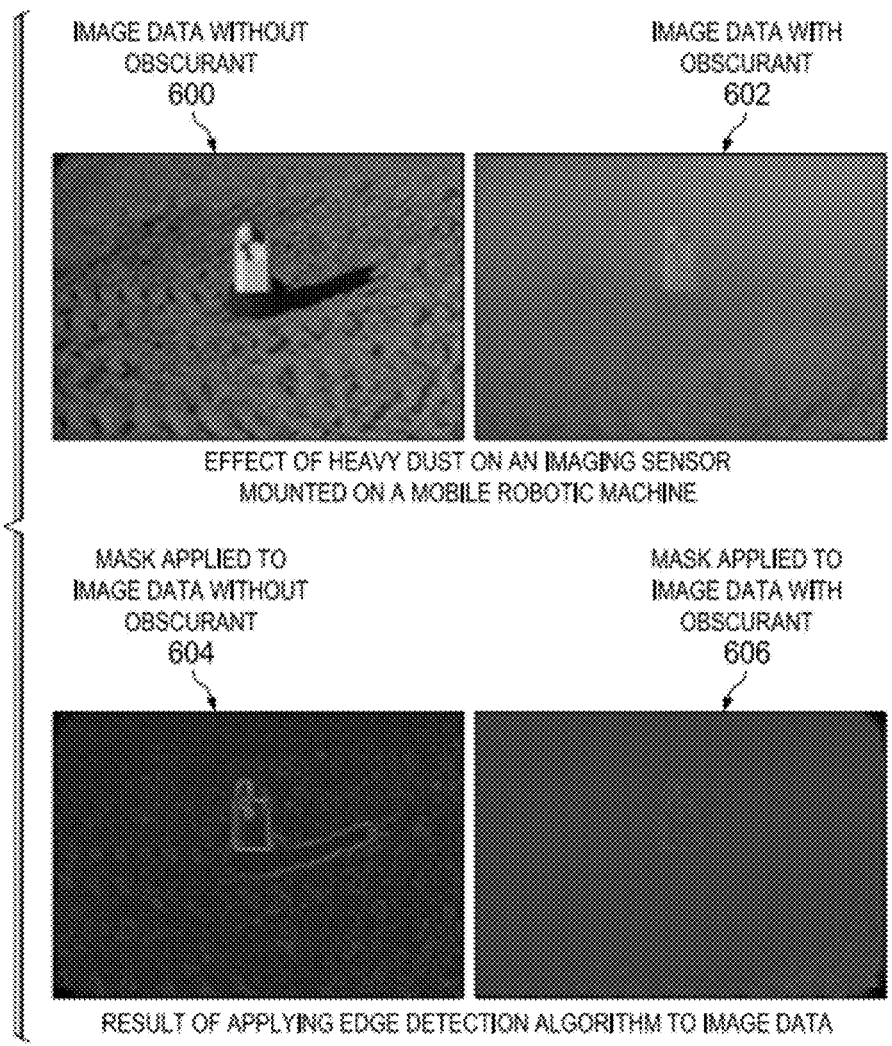
FIG. 6 is a pictorial representation of edge detection in accordance with an illustrative embodiment.

With reference now to FIG. 6, a pictorial representation of edge detection is depicted in accordance with an illustrative embodiment. Image data without obscurant 600 represents image data of an obstacle captured by an imaging sensor associated with a mobile robotic machine within an operating environment that does not include an obscurant. The image data may, for example, be image data 332 in FIG. 3. The obstacle may, for example, be obstacle 506 within operating environment 500 in FIG. 5. The imaging sensor may, for example, be visible light camera 404 in FIG. 4.

Image data with obscurant 602 represents image data of the obstacle, which is blurred by an obscurant, such as obscurant 506 in FIG. 5. Thus, image data with obscurant 602 illustrates the effects of an obscurant, such as heavy dust, on the image data captured by the imaging sensor mounted on the mobile robotic machine. Mask applied to image data without obscurant 604 represents the result of applying an edge detection algorithm to image data without obscurant 600. The edge detection algorithm may, for example, be a Sobel edge detection algorithm.

Mask applied to image data without obscurant 604 illustrates that the obstacle has sharp or well-defined edges after applying the edge detection algorithm. A machine controller for the mobile robotic machine, such as machine controller 302 in FIG. 3, is able to easily detect the edges of the obstacle within the image data after application of the mask by the edge detection algorithm. Mask applied to image data with obscurant 606 represents the result of applying the edge detection algorithm to image data with obscurant 602. In this example, the machine controller may find it difficult, if not impossible, to detect the edges of the obstacle within the image data after application of the mask by the edge detection algorithm. Consequently, illustrative embodiments use a fusion of sensor inputs from a plurality of different sensors associated with the mobile robotic machine to detect and localize obscurants and obstacles within the operating environment.

Figure 7:
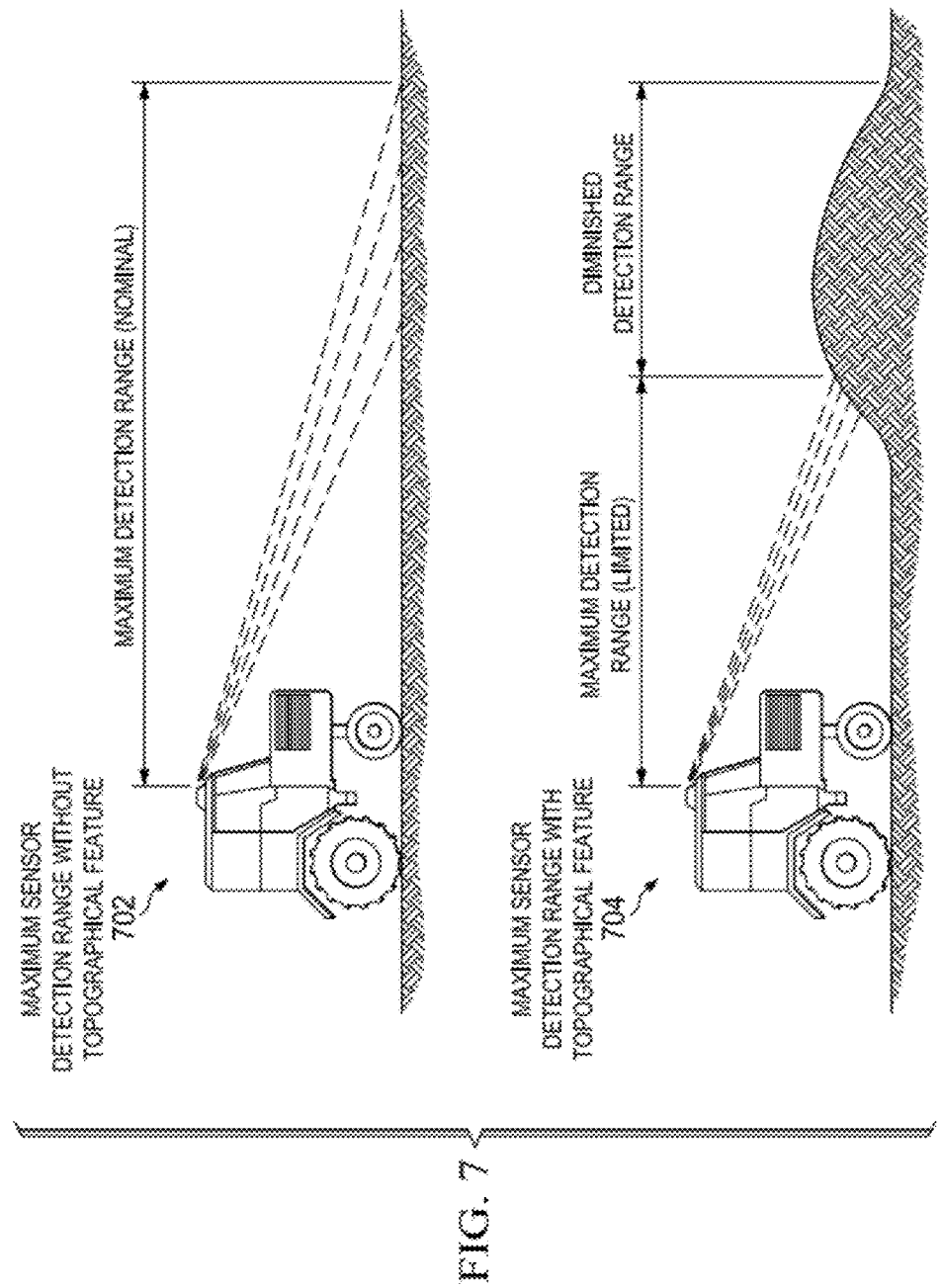
FIG. 7 is a pictorial representation of a topographical feature causing decreased sensor detection range in accordance with an illustrative embodiment.

With reference now to FIG. 7, a pictorial representation of a topographical feature causing decreased sensor detection range is depicted in accordance with an illustrative embodiment. Maximum sensor detection range without topographical feature 702 represents the greatest perception distance of a sensor system associated with a mobile robotic machine unencumbered by a topographical feature within an operating environment. The sensor system may, for example, be sensor system 310 in FIG. 3 or sensor system 400 in FIG. 4.

Maximum sensor detection range with topographical feature 704 represents a limited or restricted maximum perception distance of the sensor system, which is encumbered by a topographical feature within an operating environment. The topographical feature may, for example, be topographical feature 510 in FIG. 5. In this example, the topographical feature is a hill. The hill diminishes the detection range of the sensor system to perceive data, even though the sensor system is capable of perceiving data at a greater distance.

Figure 8A:
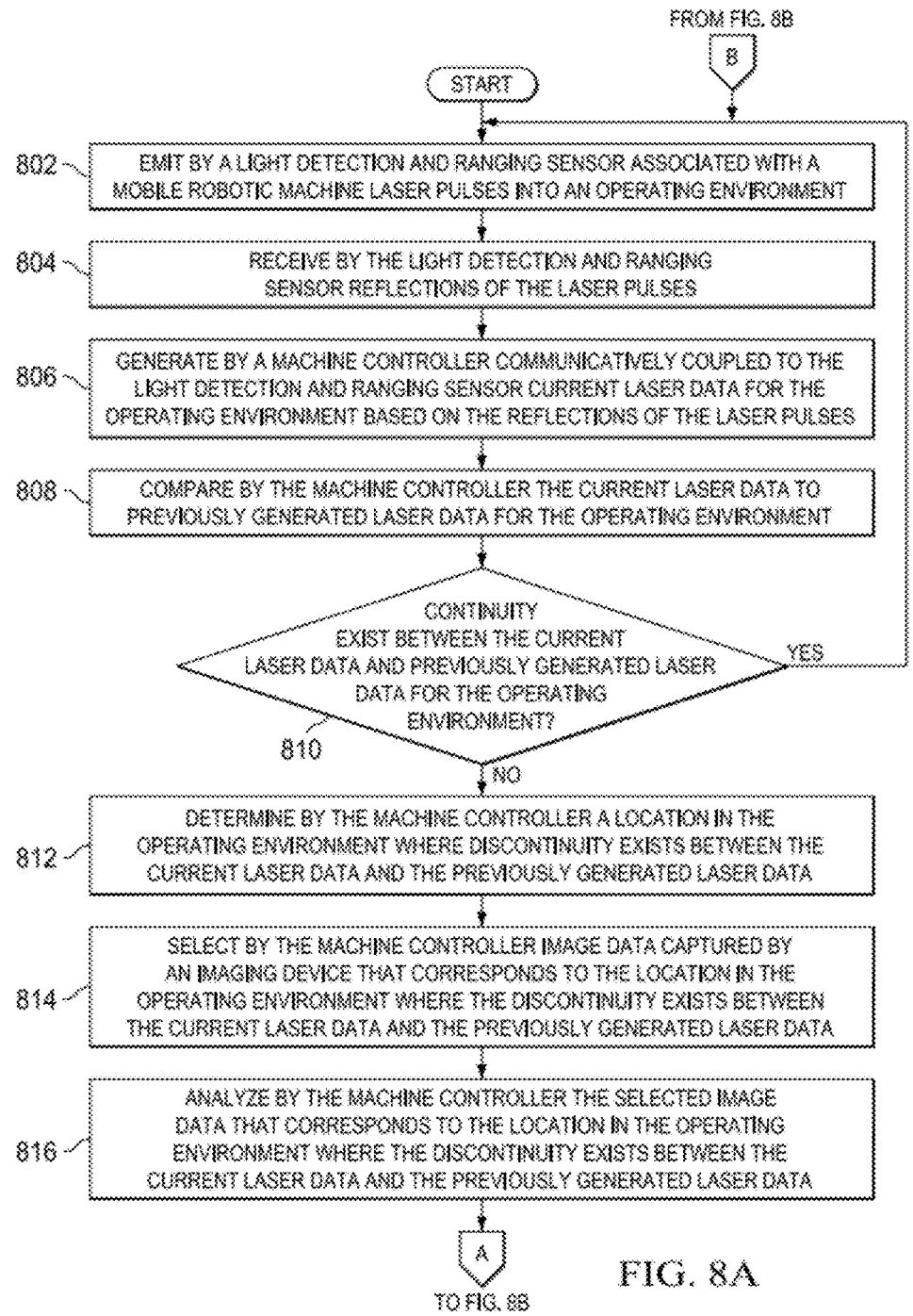
FIG. 8A and FIG. 8B is a flowchart illustrating an example process for adjusting a maximum speed of an autonomous or semi-autonomous vehicle in accordance with an illustrative embodiment.
Figure 8B:
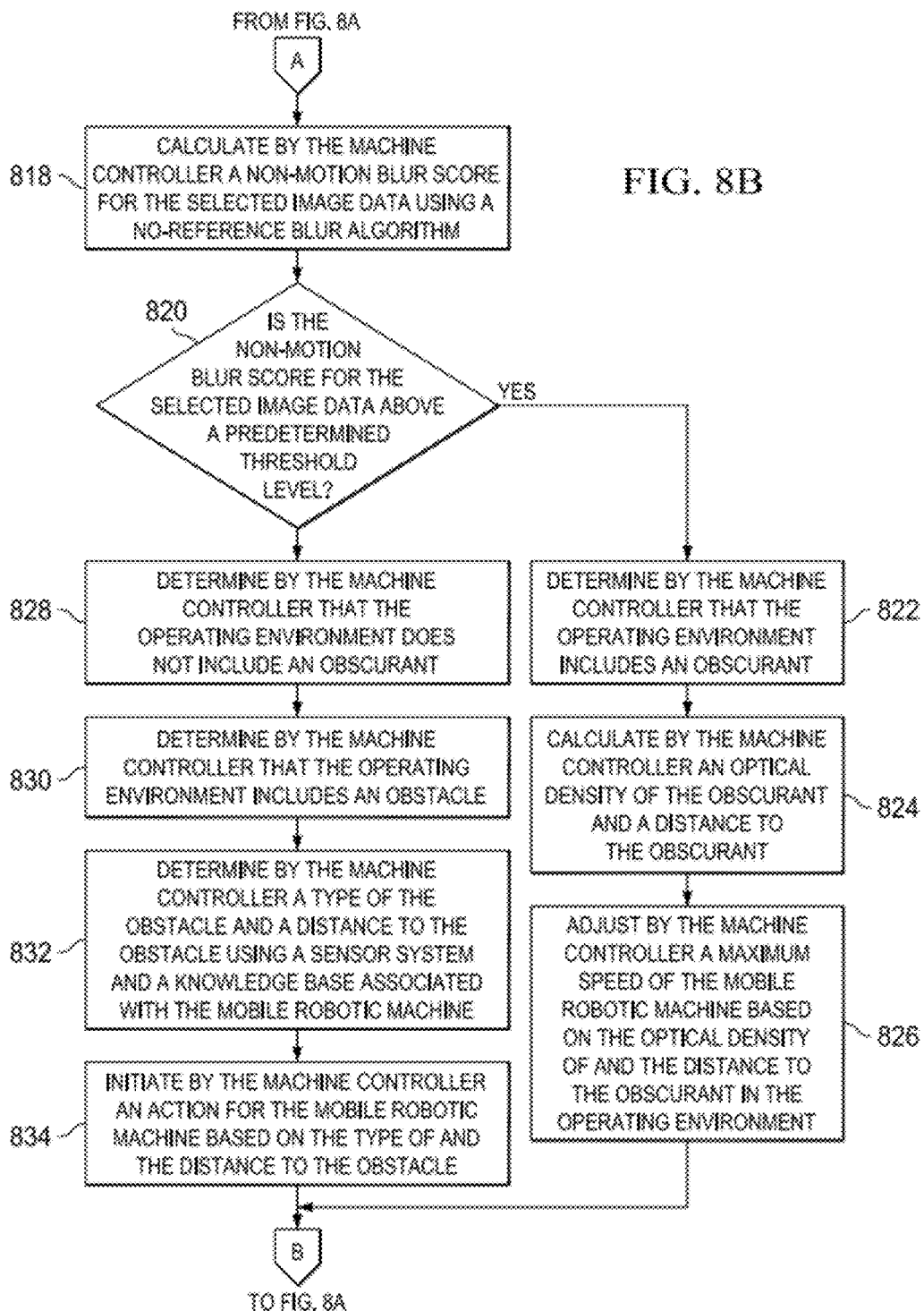

With reference now to FIG. 8A and FIG. 8B, a flowchart illustrating an example process for adjusting a maximum speed of an autonomous or semi-autonomous vehicle is shown in accordance with an illustrative embodiment. The process shown in FIGS. 8A-8B may be implemented in a mobile robotic machine, such as mobile machine system 300 in FIG. 3.

The process begins when the mobile robotic machine uses a light detection and ranging sensor, such as two dimensional/three dimensional light detection and ranging sensor 402 in FIG. 4, to emit laser pulses into an operating environment, such as operating environment 500 in FIG. 5 (step 802). After emitting the laser pulses in step 802, the light detection and ranging sensor receives reflections of the laser pulses from objects within the operating environment (step 804). Then, a machine controller, such as machine controller 302 in FIG. 3, which is communicatively coupled to the light detection and ranging sensor, generates current laser data for the operating environment based on the reflections of the laser pulses (step 806).

Subsequent to generating the current laser data in step 806, the machine controller compares the current laser data to previously generated laser data for the operating environment, such as laser data 334 in FIG. 3 (step 808). Then, the machine controller makes a determination as to whether continuity exists between the current laser data and previously generated laser data for the operating environment (step 810). Continuity means that the laser data and the previously generated laser data for the operating environment is essentially equivalent or the same. In other words, no changes in the laser data are present as compared to the previously generated laser data.

If the machine controller determines that continuity does exist between the current laser data and previously generated laser data for the operating environment, yes output of step 810, then the process returns to step 802. If the machine controller determines that continuity does not exist between the current laser data and previously generated laser data for the operating environment, no output of step 810, then the machine controller determines a location within the operating environment where discontinuity exists between the current laser data and the previously generated laser data (step 812). After determining the location of the discontinuity in step 812, the machine controller selects image data captured by an imaging device that corresponds to the location within the operating environment where the discontinuity exists between the current laser data and the previously generated laser data (step 814). The imaging device may, for example, be visible light camera 404 in FIG. 4.

Subsequently, the machine controller analyzes the selected image data that corresponds to the location in the operating environment where the discontinuity exists between the current laser data and the previously generated laser data (step 816). Afterward, the machine controller calculates a non-motion blur score for the selected image data using a no-reference blur algorithm (step 818). A non-motion blur score is a blur score of an object, image, or sub-image that significantly reduces or eliminates blur contribution from the mobile robotic machine or from an object when either or both are in motion. A non-motion blur score is a calculated value that represents an amount of blurring of edges detected in the image data. Blurring is the spreading of the edges so that the contrast between objects in the image data becomes less distinct. In other words, as the edge blur increases, the sharpness of the edges between objects in the image data decreases. This is typically due to absorption and scattering of light by an obscurant as the light travels from the surface from which it was reflected to the optical sensor. An object may, for example, be a plant, a tree, a person, a fence, a topographical feature, a furrow in the soil, or a horizon. A no-reference blur algorithm is a process for determining edge blur in an image of the operating environment based on analyzing widths of edge intensities, without requiring predetermined reference points in the operating environment for the analysis.

No-reference blur algorithms are an area of active research. Examples of papers that discuss no-reference blur algorithms include: Renting Liu, Zhaorong Li & Jiaya Jia, *Image Partial Blur Detection and Classification*, IEEE CONFERENCE ON COMPUTER VISION AND PATTERN RECOGNITION, 2008, pp. 1-8; Ming-Jun Chen & Alan Bovik, *No-Reference Image Blur Assessment Using Multiscale Gradient*, QUALITY OF MULTIMEDIA EXPERIENCE, 2009, pp. 70-74; and Yun-Chung Chung, Shyang-Lih Chang, Jung-Ming Wang & Sei-Wang Chen, *An Edge Analysis Based Blur Measure for Image Processing Applications*, JOURNAL OF TAIWAN NORMAL UNIVERSITY: MATHEMATICS, SCIENCE & TECHNOLOGY, Vol. 51, No. 1, 2006. These example papers are incorporated herein by reference.

After calculating the non-motion blur score in step 818, the machine controller makes a determination as to whether the non-motion blur score for the selected image data is above a predetermined threshold value (step 820). If the machine controller determines that the non-motion blur score for the selected image data is above the predetermined threshold value, yes output of step 820, then the machine controller determines that the operating environment includes an obscurant (step 822). The obscurant may, for example, be heavy dust, such as obscurant 506 in FIG. 5.

After determining that an obscurant is located within the operating environment in step 822, the machine controller calculates an optical density of the obscurant and a distance to the obscurant (step 824). The optical density of the obscurant is a ratio of energy received at a sensor relative to the energy transmitted from or reflected from a point of origin. The optical density can often be correlated to physical attributes of the obscurant, such as, for example, material density, material composition, or particle size. An example of a paper that discusses optical density is: Debbie Kedar & Shlomi Arnon, *Optical wireless communication through fog in the presence of pointing errors*, APPLIED OPTICS, Vol. 42, No. 24, 2003, pp. 4946-4954, which is incorporated herein by reference.

Then, the machine controller adjusts a maximum speed of the mobile robotic machine based on the optical density of and the distance to the obscurant in the operating environment (step 826). In other words, the machine controller reduces or decreases the maximum allowed speed of the mobile robotic machine to provide the sensor system more time to collect data due to the diminished perception capabilities of the sensor system caused by the obscurant. In addition, decreasing the maximum allowed speed of the mobile robotic machine allows the machine controller more time to analyze and react to incoming sensor data. The process returns to step 802 thereafter.

Returning again to step 820, if the machine controller determines that the non-motion blur score for the selected image data is not above the predetermined threshold value, no output of step 820, then the machine controller determines that the operating environment does not include an obscurant (step 828). Further, the machine controller determines that the operating environment includes an obstacle, such as obstacle 508 in FIG. 5 (step 830). Afterward, the machine controller determines a type of the obstacle and a distance to the obstacle using a sensor system and a knowledge base associated with the mobile robotic machine (step 832). The sensor system and the knowledge base may, for example, be sensor system 310 and horticultural knowledge base 322 in FIG. 3.

Subsequent to determining the obstacle type and distance in step 832, the machine controller initiates an action for the mobile robotic machine based on the type of and the distance to the obstacle (step 834). The action may, for example, be an avoidance maneuver or a stopping maneuver depending on the type of and distance to the obstacle. The process returns to step 802 thereafter.

Figure 9:
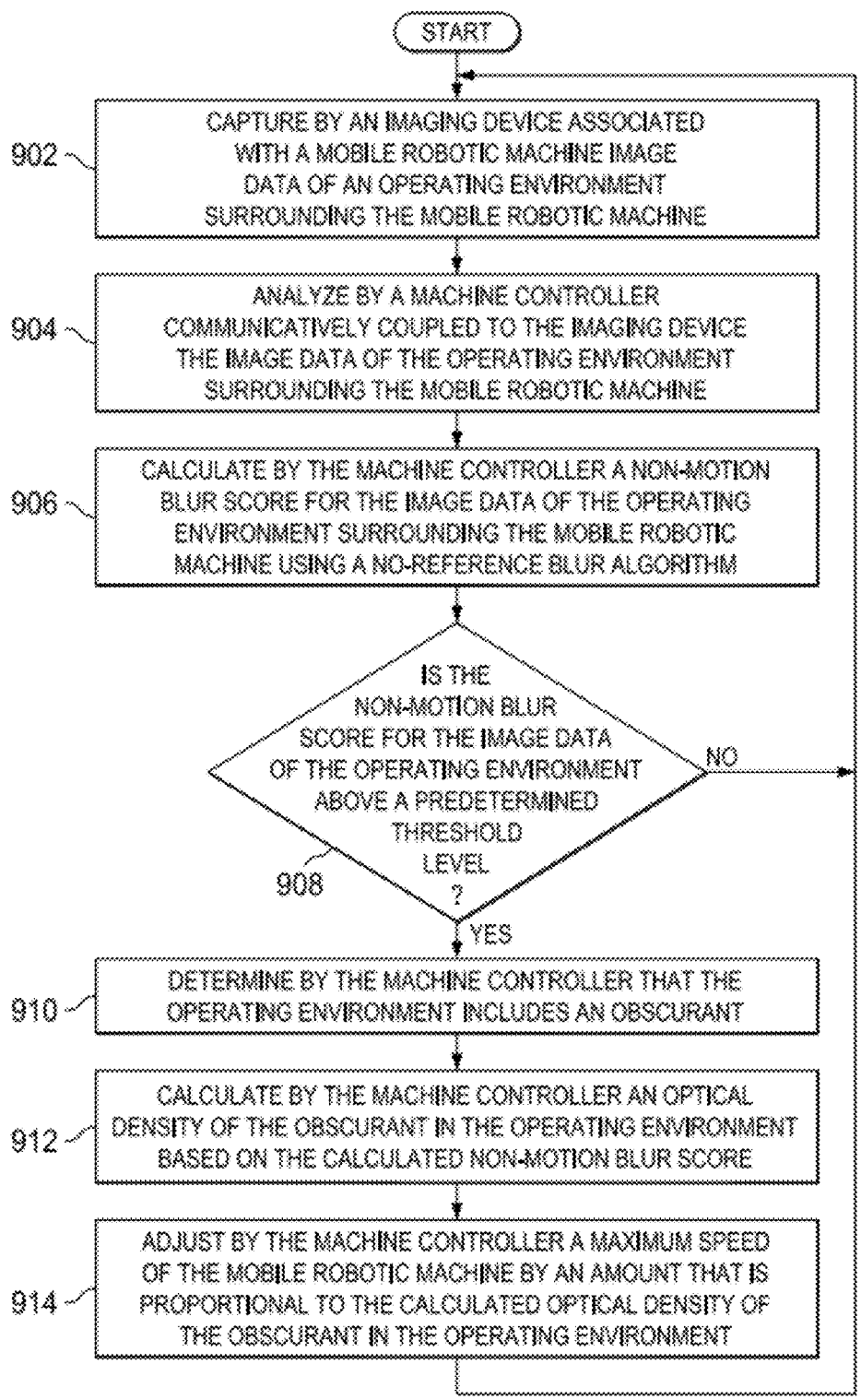
FIG. 9 is a flowchart illustrating an alternate example process for adjusting a maximum speed of an autonomous or semi-autonomous vehicle in accordance with an illustrative embodiment.

With reference now to FIG. 9, a flowchart illustrating an alternate example process for adjusting a maximum speed of an autonomous or semi-autonomous vehicle is shown in accordance with an illustrative embodiment. The process shown in FIG. 9 may be implemented in a mobile robotic machine, such as mobile machine system 300 in FIG. 3.

The process begins when the mobile robotic machine uses an imaging device to capture image data of an operating environment surrounding the mobile robotic machine (step 902). The imaging device may, for example, be visible light camera 404 in FIG. 4 and the image data may, for example, be image data 332 in FIG. 3. The operating environment may, for example, be operating environment 500 in FIG. 5.

After the imaging device captures the image data in step 902, a machine controller, which is communicatively coupled to the imaging device, analyzes the image data of the operating environment surrounding the mobile robotic machine (step 904). The machine controller may, for example, be machine controller 302 in FIG. 3. Subsequently, the machine controller calculates a non-motion blur score for the image data of the operating environment surrounding the mobile robotic machine using a no-reference blur algorithm (step 906). Then, the machine controller makes a determination as to whether the non-motion blur score for the image data of the operating environment is above a predetermined threshold value (step 908).

If the machine controller determines that the non-motion blur score for the image data of the operating environment is not above the predetermined threshold value, no output of step 908, then the process returns to step 902. If the machine controller determines that the non-motion blur score for the image data of the operating environment is above the predetermined threshold value, yes output of step 908, then the machine controller determines that the operating environment includes an obscurant (step 910). The obscurant may, for example, be obscurant 506 in FIG. 5.

After determining that an obscurant is located within the operating environment in step 910, the machine controller calculates an optical density of the obscurant in the operating environment based on the calculated non-motion blur score (step 912). Then, the machine controller adjusts a maximum speed of the mobile robotic machine based on an amount that is proportional to the calculated optical density of the obscurant in the operating environment (step 914). Thereafter, the process returns to step 902.

With reference now to FIG. 10, a flowchart illustrating another alternate example process for adjusting a maximum speed of an autonomous or semi-autonomous vehicle is shown in accordance with an illustrative embodiment. The process shown in FIG. 10 may be implemented in a mobile robotic machine, such as mobile machine system 300 in FIG. 3.

The process begins when the mobile robotic machine uses a light detection and ranging sensor to project a pattern of light into an operating environment surrounding the mobile robotic machine (step 1002). The light detection and ranging sensor may, for example, be two dimensional/three dimensional light detection and ranging sensor 402 in FIG. 4. The operating environment may, for example, be operating environment 500 in FIG. 5.

After projecting the pattern of light into the operating environment in step 1002, the light detection and ranging sensor captures an image of the projected pattern of light in the operating environment surrounding the mobile robotic machine (step 1004). Then, a machine controller, which is communicatively coupled to the light detection and ranging sensor, analyzes the image of the projected pattern of light (step 1006). The machine controller may, for example, be machine controller 302 in FIG. 3.

Subsequently, the machine controller calculates a sharpness score for edges detected in the image of the projected pattern of light using a no-reference sharpness algorithm (step 1008). A sharpness score is a calculated value that represents an amount of sharpness of edges detected in the image of the projected pattern of light. Sharpness is well-defined edges so that the image of the projected pattern of light is distinct. In other words, as the edge sharpness increases, the blur of the edges decreases. A no-reference sharpness algorithm is a process for determining edge sharpness in the image of the projected pattern of light in the operating environment based on analyzing widths of edge intensities, without requiring predetermined references points in the operating environment for the analysis.

After calculating the sharpness score in step 1008, the machine controller makes a determination as to whether the sharpness score for the edges detected in the image of the projected pattern of light is above a predetermined threshold value (step 1010). If the machine controller determines that the sharpness score for the edges detected in the image of the projected pattern of light is above the predetermined threshold value, yes output of step 1010, then the process returns to step 1002. If the machine controller determines that the sharpness score for the edges detected in the image of the projected pattern of light is not above the predetermined threshold value, no output of step 1010, then the machine controller determines that the operating environment includes an obscurant (step 1012). The obscurant may, for example, be obscurant 506 in FIG. 5.

After determining that an obscurant is located within the operating environment in step 1012, the machine controller calculates an optical density of the obscurant in the operating environment based on the calculated sharpness score (step 1014). Then, the machine controller adjusts a maximum speed of the mobile robotic machine based on an amount that is inversely proportional to the calculated optical density of the obscurant in the operating environment (step 1016). Thereafter, the process returns to step 1002.

Thus, illustrative embodiments provide a method and system for governing a maximum allowed speed of an autonomous or semi-autonomous mobile robotic machine when a maximum effective range of the sensor system associated with the machine is decreased. The flowchart diagrams in the Figures illustrate the functionality and operation of possible implementations of methods and systems according to various embodiments of the present invention. In this regard, each block in the flowchart diagrams may represent a module, segment, or portion of code, which comprises one or more executable instructions for implementing the specified logical function(s). It should also be noted that, in some alternative implementations, the functions noted in the block may occur out of the order noted in the figures. For example, blocks shown in succession may, in fact, be executed substantially concurrently, or the blocks may sometimes be executed in an entirely different order or in reverse order, depending upon the functionality involved. It will also be noted that each block of the flowchart illustrations, and combinations of blocks in the flowchart illustrations, can be implemented by special purpose hardware-based systems that perform the specified functions or acts, or combinations of special purpose hardware and computer instructions.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method of adjusting a speed of a mobile machine based on an obscurant, the method comprising:
    a machine controller generating from a first sensor current sensor data for a location;
    the machine controller comparing the current sensor data for the location to previously generated sensor data for the location;
    based on the comparing, the machine controller determining a discontinuity in sensor data for the location indicating a presence of an object;
    responsive to determining the discontinuity in sensor data for the location, the machine controller utilizing a second type of sensor to collect image data of the location;
    analyzing the image data to determine if a non-motion blur score for the image data is above a threshold value, wherein the non-motion blur score represents an amount of blurring of at least one edge of the object detected in the image data, and wherein the obscurant is determined to exist if the non-motion blur score is above the threshold value; and
    adjusting, by the machine controller, the speed of the mobile machine based on an optical density of the obscurant.

2. The method of claim 1 further comprising:
    determining, by the machine controller, the location within an operating environment of the mobile machine where the discontinuity exists between the currently generated data and the previously generated data for the operating environment; and
    selecting, by the machine controller, the image data that corresponds to the location where the discontinuity exists between the currently generated data and the previously generated data for the operating environment.

3. The method of claim 1 further comprising:
    responsive to a determination that the non-motion blur score for the image data is not above the threshold value, determining, by the machine controller, that an operating environment of the mobile machine includes an obstacle;
    determining, by the machine controller, a type of the obstacle and a distance to the obstacle using a sensor system and a knowledge base associated with the mobile machine; and
    initiating, by the machine controller, an action for the mobile machine based on the type of and the distance to the obstacle.

4. The method of claim 1 further comprising:
    emitting, by a sensor associated with the mobile machine, pulses into an operating environment around the mobile machine;
    receiving, by the sensor, reflections of the pulses from objects in the operating environment;
    generating, by the machine controller, current data for the operating environment based on the reflections of the pulses;
    comparing, by the machine controller, the current data with the previously generated data for the operating environment; and
    determining, by the machine controller, whether continuity exists between the current data and the previously generated data.

5. The method of claim 2 wherein the obscurant is at least one of dust, fog, smoke, snow, rain, ash, or steam within the operating environment, and wherein the optical density of the obscurant is a ratio of energy received at the second type of sensor relative to energy transmitting from a point of origin.

6. The method of claim 1 wherein the second type of sensor is a video camera.

7. The method of claim 1 wherein the machine controller adjusts the speed of the mobile machine by decreasing a maximum allowed speed of the mobile machine.

8. The method of claim 3 wherein the action is an avoidance maneuver.

9. The method of claim 1 wherein the mobile machine is one of a plurality of mobile machines performing tasks within an operating environment, and wherein the plurality of mobile machines are in communication with each other via a network.

10. The method of claim 1 wherein the mobile machine is an autonomous mobile robotic machine.

11. The method of claim 1 wherein the machine controller is located on the mobile device.

12. The method of claim 1 wherein the machine controller is located on a remote server device.

13. The method of claim 4 wherein second type of sensor is a video camera.

14. The method of claim 13, further comprising:
    associating mapped image data points of previously collected image data to corresponding data points of the currently generated sensor data.

* * * * *